(12) United States Patent
Li et al.

(10) Patent No.: US 12,030,798 B2
(45) Date of Patent: Jul. 9, 2024

(54) INTEGRATED RIPARIAN SYSTEM FOR ON-SITE TREATMENT OF RIVER/LAKE SILT AND APPLICATION THEREOF

(71) Applicant: Jiangnan University, Wuxi (CN)

(72) Inventors: Yifei Li, Wuxi (CN); Hua Zou, Wuxi (CN); Jie Lian, Wuxi (CN); Jiannan Ding, Wuxi (CN); Shanfei Fu, Wuxi (CN); Zhenyu Wang, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 406 days.

(21) Appl. No.: 17/527,257

(22) Filed: Nov. 16, 2021

(65) Prior Publication Data

US 2022/0073392 A1    Mar. 10, 2022

Related U.S. Application Data

(63) Continuation of application No. PCT/CN2020/096913, filed on Jun. 19, 2020.

(30) Foreign Application Priority Data

Jun. 21, 2019 (CN) .......................... 201910542919.6

(51) Int. Cl.
*C02F 3/32* (2023.01)
*C02F 11/02* (2006.01)
(Continued)

(52) U.S. Cl.
CPC ................ *C02F 3/327* (2013.01); *C02F 3/32* (2013.01); *C02F 11/02* (2013.01); *E02B 3/12* (2013.01);
(Continued)

(58) Field of Classification Search
CPC .. C02F 3/327; C02F 3/32; C02F 11/02; C02F 2101/105; C02F 2101/16; C02F 2103/007;
(Continued)

(56) References Cited

FOREIGN PATENT DOCUMENTS

CN      101314512 A       12/2008
CN      102001756 A   *   4/2011
(Continued)

OTHER PUBLICATIONS

Machine-generated English translation of CN 102001756, generated on Feb. 20, 2024.*
(Continued)

*Primary Examiner* — Fred Prince
(74) *Attorney, Agent, or Firm* — IPRO, PLLC; Na Xu

(57) ABSTRACT

The disclosure discloses an integrated riparian system for river/lake silt on-site treatment and application thereof, belonging to the technical field of silt treatment. The integrated riparian system includes three subsystems, namely a silt ecological treatment subsystem, a siphon drainage subsystem and a silt leachate advanced treatment subsystem. The silt ecological treatment subsystem is provided with plants, fillers, an aeration pipe and a water collection pipe from top to bottom, and a vent pipe is connected to the water collection pipe. A siphon in the siphon drainage subsystem is retractable and hump-shaped. The silt leachate advanced treatment subsystem includes a first-stage ecological treatment unit upflow wetland and a second-stage ecological treatment unit surface flow wetland. According to the disclosure, dewatering and harmlessness of silt, advanced treatment of silt leachate and purification of part of river/lake water are effectively realized through transpiration and absorption of the plants, filtration and adsorption of the fillers and degradation of microorganisms.

10 Claims, 2 Drawing Sheets

(51) Int. Cl.
  *E02B 3/12*      (2006.01)
  *E02D 31/00*     (2006.01)
  *E03F 3/02*      (2006.01)
  *E03F 5/20*      (2006.01)
  *C02F 101/10*    (2006.01)
  *C02F 101/16*    (2006.01)
  *C02F 103/00*    (2006.01)

(52) U.S. Cl.
  CPC .............. *E02D 31/006* (2013.01); *E03F 3/02* (2013.01); *E03F 5/20* (2013.01); *C02F 2101/105* (2013.01); *C02F 2101/16* (2013.01); *C02F 2103/007* (2013.01); *Y02W 10/10* (2015.05)

(58) Field of Classification Search
  CPC .. E02B 3/12; E02D 31/006; E03F 3/02; E03F 5/20; Y02W 10/10
  USPC ....... 210/602, 615, 616, 617, 150, 151, 290, 210/170.09, 747.5
  See application file for complete search history.

(56) References Cited

FOREIGN PATENT DOCUMENTS

| | | | |
|---|---|---|---|
| CN | 201981061 U | 9/2011 | |
| CN | 103058463 A | 4/2013 | |
| CN | 103342445 A | 10/2013 | |
| CN | 105967475 A | 9/2016 | |
| CN | 107365036 A | 11/2017 | |
| CN | 109354200 A * | 2/2019 | ............... C02F 3/32 |
| CN | 110171917 A | 8/2019 | |
| JP | 2008068211 A | 3/2008 | |

OTHER PUBLICATIONS

Machine-generated English translation of CN 109354200, generated on Feb. 20, 2024.*
Machine-generated English translation of CN 103342445, generated on Feb. 20, 2024.*
Machine-generated English translation of CN 101314512, generated on Feb. 20, 2024.*
Machine-generated English translation of CN 105967475, generated on Feb. 20, 2024.*

* cited by examiner

INTEGRATED RIPARIAN SYSTEM FOR ON-SITE TREATMENT OF RIVER/LAKE SILT AND APPLICATION THEREOF

TECHNICAL FIELD

The disclosure relates to an integrated riparian system for on-site treatment of river/lake silt and application thereof, belonging to the technical field of river/lake silt treatment.

BACKGROUND

Silt is the deposit that gradually settles to the bottom of still or slow flowing water environments through various physical, chemical and biological actions. Silt is characterized by high natural water content, strong compressibility and gray-black appearance, and is rich in organic matters, minerals, heavy metals and other substances. On the one hand, the nutrients such as nitrogen and phosphorus in the river/lake silt can be directly ingested by microorganisms, enter the food chain, and participate in the circulation of aquatic ecosystems. On the other hand, the nutrients can be also released from the bottom silt and reenter the water under certain environmental conditions, resulting in the endogenous pollution of rivers or lakes. When there is excessive silt in rivers/lakes, a series of problems would be caused, for example, eutrophication, black and smelly water, large-scale reduction in aquatic organisms. Therefore, desilting is essential for river/lake management to effectively control the endogenous pollution. However, due to the characteristics of silt, how to treat the silt removed from rivers/lakes is a real conundrum.

At present, silt treatment technologies at home and abroad mainly include: a traditional storage yard method, an underwater silt throwing method, a vacuum preloading method, a physical dewatering and consolidation method, a high-temperature melting and sintering method and a chemical solidification method. The traditional storage yard method has the advantages of large treatment capacity, simple construction process equipment and low cost, but has the disadvantages of large floor area, difficulty in land acquisition and easy formation of secondary pollution. The underwater silt throwing method is to dump silt into the sea, which will bring adverse effects to the marine environment; and with the increase in efforts to protect the sea, this method is gradually restricted by various aspects. The vacuum preloading method has the advantages of simple construction machinery and equipment and easy operation, but also has very obvious disadvantages, such as needs for a large number of storage yards, long occupation time and easy formation of secondary pollution. The physical dewatering and consolidation method is only applicable to small-lot silt treatment, and has the disadvantages of high energy consumption and high cost. The high-temperature melting and sintering method can fire silt into a building material, but has the disadvantages of low silt treatment capacity, high energy consumption and high cost. The chemical solidification method can realize large-lot treatment due to mature process equipment, but still needs a large number of storage yards, and the high water content in the silt makes the treatment cost very high. All the above technologies are to transport the silt outward and then perform centralized treatment, which is time-consuming and laborious and may easily cause secondary pollution. Therefore, it is of great application significance to find an environment-friendly technology that can treat silt on situ at low cost.

Phytoremediation technologies (for example, constructed wetlands, and ecological filter beds) have the advantages of low investment, simple management and low operating expenses, and belong to low-carbon environment-friendly ecological technologies. The phytoremediation technologies are widely used in sewage treatment and have been promoted to the field of river/lake water quality improvement. However, the phytoremediation technologies are rarely used in silt treatment.

SUMMARY

In order to solve the above problems, the disclosure constructs an integrated riparian system for river/lake silt on-site treatment based on phytoremediation technologies. In the disclosure, engineering construction can be performed flexibly according to the topography of the river/lake side, so that dewatering and harmlessness of silt, advanced treatment of silt leachate and purification of part of the river/lake water can be effectively realized through transpiration and absorption of plants, filtration and adsorption of fillers and degradation of microorganisms. The entire integrated riparian system realizes on-site treatment of river/lake silt, and has the advantages of low construction investment cost, simple management and operation, low expenses, environmental friendliness and not easy formation of secondary pollution, the dried silt can be reused as an organic fertilizer in green land or farmland, and effluent after leachate treatment can be directly discharged into the river/lake.

The disclosure discloses an integrated riparian system for river/lake silt on-site treatment, including three subsystems, namely a silt ecological treatment subsystem, a siphon drainage subsystem and a silt leachate advanced treatment subsystem. The silt ecological treatment subsystem is provided with plants, fillers, an aeration pipe and a water collection pipe from top to bottom, and equipped with a vent pipe that is connected to the water collection pipe. A siphon in the siphon drainage subsystem is retractable and hump-shaped. The silt leachate advanced treatment subsystem includes two stages of ecological treatment units, namely an upflow wetland and a surface flow wetland.

In an embodiment of the disclosure, the fillers of the silt ecological treatment subsystem are disposed in layers from bottom to top, including a drainage layer (gravel with a thickness of 10-30 cm and a diameter of 10-30 mm), a transition layer (gravel with a thickness of 5-20 cm and a diameter of 4-15 mm), a filter layer (gravel/zeolite/sand/ceramsite/volcanic rock with a thickness of 15-45 cm and a diameter of 0.5-5 mm) and a cover layer (gravel with a thickness of 5-15 cm and a diameter of 8-20 mm), and geotextile with good water permeability is laid between the layers to prevent the layers of fillers from being mixed during aeration.

In an embodiment of the disclosure, a bottom slope of the silt ecological treatment subsystem is 0.1%-0.3%, a perforated water collection pipe is disposed, the water collection pipe is connected to the vent pipe, the pipes have an inner diameter of 8-15 cm, and the vent pipe is 15-30 cm higher than a tank body; and the aeration pipe is closely attached to the water collection pipe and disposed thereon, and the water collection pipe and the vent pipe are respectively wrapped with geotextile.

In an embodiment of the disclosure, a tank body of the siphon drainage subsystem is prefabricated with reinforced concrete, the siphon is hump-shaped, a horizontal inclination angle of an ascending section is 30-45°, a top of the hump is provided with a vacuum breaking valve, the siphon is designed to be retractable, a height of the siphon is flexibly adjustable in a range of 15-50 cm, a vertex of the hump is 15-35 cm higher than the water collection pipe of the silt ecological treatment subsystem, a water level of effluent of the siphon is 20-40 cm lower than a water level of the water collection pipe, and the siphon has an inner diameter of 8-15 cm.

In an embodiment of the disclosure, the fillers of the upflow wetland of the silt leachate advanced treatment subsystem are disposed in layers from bottom to top, including a water inlet layer (gravel with a thickness of 10-30 cm and a diameter of 10-30 mm), a filter layer (gravel/zeolite/sand/ceramsite/volcanic rock with a thickness of 15-30 cm and a diameter of 0.5-5 mm) and a drainage layer (gravel with a thickness of 10-30 cm and a diameter of 10-30 mm).

In an embodiment of the disclosure, a perforated water inlet pipe and a drainage pipe of the upflow wetland are respectively disposed in the water inlet layer and the drainage layer, the pipes have an inner diameter of 8-15 cm, a water level difference between the two pipes is 20-40 cm, and the water level of the water inlet pipe is 40-60 cm lower than the vertex of the hump of the siphon.

In an embodiment of the disclosure, the second-stage ecological treatment unit surface flow wetland of the silt leachate advanced treatment subsystem has a same water level as the river/lake and is separated from the river/lake with wood piles, treated effluent may be directly discharged outward into the river/lake, and river/lake water is automatically supplied into the surface flow wetland when there is insufficient water in the wetland.

In an embodiment of the disclosure, PE anti-seepage membranes are laid on tank bottoms and tank walls of the silt ecological treatment subsystem and the silt leachate advanced treatment subsystem, and geotextile is laid between the layers of fillers.

In an embodiment of the disclosure, emergent plants are grown in the silt ecological treatment subsystem, emergent plants and hygrophytes are grown on the upflow wetland of the silt leachate advanced treatment subsystem, and emergent plants, floating-leaved plants and submerged plants are grown in the surface flow wetland.

In an embodiment of the disclosure, the drainage layer is gravel with a thickness of 15 cm and a diameter of 10-30 mm; the transition layer is gravel with a thickness of 10 cm and a diameter of 4-15 mm; the filter layer is volcanic rock with a thickness of 25 cm and a diameter of 0.5-5 mm; the cover layer is gravel with a thickness of 10 cm and a diameter of 8-20 mm; the fillers of the first-stage ecological treatment unit upflow wetland of the silt leachate advanced treatment subsystem are disposed in layers from bottom to top, including the water inlet layer, the filter layer and the drainage layer; the water inlet layer is gravel with a thickness of 15 cm and a diameter of 10-30 mm; the filter layer is volcanic rock with a thickness of 20 cm and a diameter of 0.5-5 mm; and the drainage layer is gravel with a thickness of 15 cm and a diameter of 10-30 mm.

The disclosure discloses a method for treating silt by applying the above integrated riparian system. The method is as follows:

(1) silt ecological treatment is performed: plants are grown on the cover layer of the silt ecological treatment subsystem, silt is periodically discharged therein, the silt ecological treatment subsystem is equipped with the vent pipe and the aeration pipe inside, and aeration is performed at certain intervals to accelerate silt treatment, ensure oxygen transfer and effectively avoid blockage of fillers; dewatering and harmlessness of the silt are realized under synergetic effects of the plants, the fillers and microorganisms;

(2) a perforated water collection pipe is laid at the bottom of the silt ecological treatment subsystem, collected leachate enters the silt leachate advanced treatment subsystem through the siphon drainage subsystem, and the siphon drainage subsystem may automatically control the water level, thereby realizing intermittent drainage; and (3) in the silt leachate advanced treatment subsystem, the leachate is sequentially subjected to two stages of ecological treatment, namely an upflow wetland and a surface flow wetland, effluent may be discharged into the river/lake after reaching the standard, and river/lake water may enter the surface flow wetland when there is insufficient water, thereby realizing purification of part of the river/lake water.

In an embodiment of the disclosure, the silt in step (1) is river/lake silt with a water content of higher than 70%, the silt is added at a load of 50-80 kg dry matter/($m^2$·a) and spread in layers on the cover layer of the silt ecological treatment subsystem every 30-60 days with a thickness of not more than 15 cm each time until a tank body is fully filled, a final height of filling being 0.5-1.2 m, and the silt is removed when the water content is reduced to 50% or below.

In an embodiment of the disclosure, in step (1), an aeration interval is 15-30 days, an aeration rate is 50-100 mL/min, and an aeration time is 1-2 days.

The disclosure discloses application of the integrated riparian system in the field of silt treatment.

Beneficial Effects (1) In the integrated riparian system, engineering construction can be performed flexibly according to the topography of the river/lake side to realize on-site treatment of the silt, so there is no need to transport the silt outward for centralized treatment, which makes the construction investment cost low.

(2) The silt ecological treatment subsystem in the integrated riparian system can effectively realize dewatering and harmlessness of the silt, and can reuse the treated silt as an organic fertilizer in surrounding green land or farmland, thereby realizing resource utilization of the silt.

(3) The leachate is treated by the silt leachate advanced treatment subsystem in the integrated riparian system and discharged outward into the river/lake after reaching the standard, which is environmentally friendly and avoids secondary pollution, and purification of a part of the river/lake water can be realized, thereby improving water quality of the river/lake.

(4) According to the integrated riparian system, under synergetic effects of the silt ecological treatment subsystem and the silt leachate advanced treatment subsystem, the water content of the silt is reduced from 90% to 45%, and the effluent reaches Class III water quality standard in terms of concentrations of pollutants such as COD, TN, TP, ammonia nitrogen, copper, mercury and arsenic, and can be directly discharged into the river/lake.

(5) The integrated riparian system is simple in management and operation, and the siphon drainage subsystem and the silt leachate advanced treatment subsystem do not need any power source and do not give rise to expenses for power except the aeration expenses of the silt ecological treatment subsystem, so the entire system is low in management and operation expenses.

(6) Multiple wetland plants are grown in the integrated riparian system, so that a good landscape effect can be created, thereby beautifying the riparian environment of the river/lake.

In the figures, 1—silt ecological treatment subsystem, 2—siphon drainage subsystem, 3—silt leachate advanced treatment subsystem-upflow wetland, 4—silt leachate advanced treatment subsystem-surface flow wetland, 5—river, 6—drainage layer of silt ecological treatment subsystem, 7—transition layer of silt ecological treatment subsystem, 8—filter layer of silt ecological treatment subsystem, 9—cover layer of silt ecological treatment subsystem, 10—silt layer of silt ecological treatment subsystem, 11—aeration pipe of silt ecological treatment subsystem, 12—vent pipe of silt ecological treatment subsystem, 13—water collection pipe of silt ecological treatment subsystem, 14—siphon, 15—water inlet layer of upflow wetland, 16—filter layer of upflow wetland, 17—drainage layer of upflow wetland, 18—drainage layer of silt landfill tank, 19—water collection well of silt landfill tank.

DETAILED DESCRIPTION

The disclosure provides an environment-friendly integrated riparian system for river/lake silt on-site treatment at low cost. The disclosure will be further described in detail below in conjunction with the accompanying drawings.

Detection methods involved in the following examples and comparative examples are as follows:
1. Silt water content detection method: Determination is performed according to a weight method in CJ/T221-2005 "Determination Method for Municipal Sludge in Wastewater Treatment Plant" recommended for detecting sludge water content in GBT 24602-2009 "Disposal of Sludge from Municipal Wastewater Treatment Plant—Quality of Sludge Used in Separate Incineration".
2. COD detection method: Determination is performed with reference to Chinese Standard GB11914-89 Potassium Dichromate Method.
3. TN detection method: Determination is performed with reference to Chinese Standard GB11894-89 Alkaline Potassium Persulfate Digestion UV Spectrophotometry.
4. TP detection method: Determination is performed with reference to Chinese Standard GB11893-89 Ammonium Molybdate Spectrophotometry.
5. Ammonia nitrogen detection method: Determination is performed with reference to Chinese Standard 7479-87 Nessler's Reagent Spectrophotometry.
6. Heavy metal copper detection method: Determination is performed with reference to Chinese Standard GB/T7475-1987 Atomic Absorption Spectrophotometry.
7. Heavy metal mercury detection method: Determination is performed with reference to Chinese Standard GB/T7468-1987 Atomic Absorption Spectrophotometry.
8. Heavy metal mercury detection method: Determination is performed with reference to Chinese Standard GB/T7485-1987 Silver Diethyldithiocarbamate Spectrophotometry.

Example 1

Figure 1:
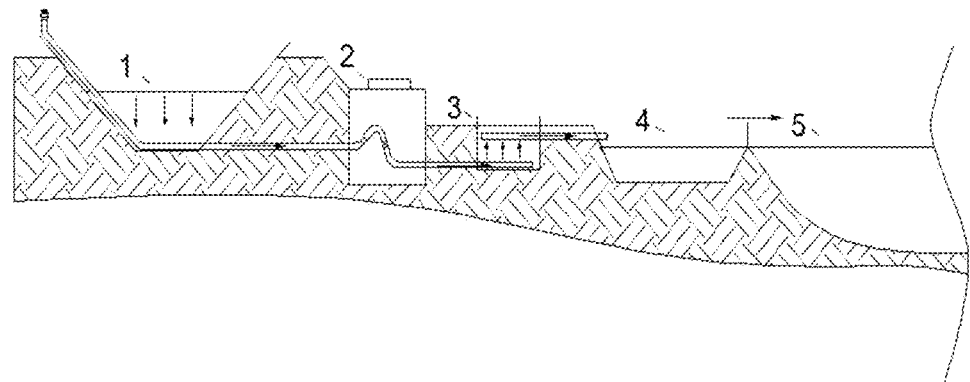
FIG. 1 is a schematic diagram of an integrated riparian system for river silt on-site treatment.

At a certain river side in Wuxi, the integrated riparian system for silt on-site treatment of the disclosure was disposed (as shown in FIG. 1). The system was 20 m long and 16 m wide. Silt dredged from the river was firstly spread in a silt ecological treatment subsystem, and collected leachate entered a silt leachate advanced treatment subsystem through a siphon drainage subsystem for treatment, and effluent was finally discharged into the river.

Figure 2:
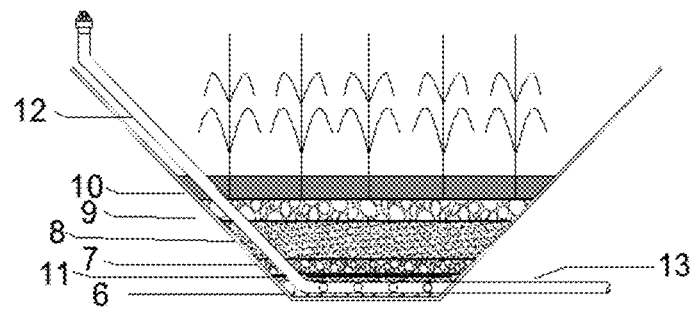
FIG. 2 is a schematic diagram of a river silt ecological treatment subsystem.

The silt ecological treatment subsystem is shown in FIG. 2. The cross section of the system was in a shape of a trapezoid whose lower base was 2 m long and upper base was 4.6 m. The final height of the silt could reach 0.8 m. Fillers were disposed in layers from bottom to top, including a drainage layer (gravel with a thickness of 15 cm and a diameter of 10-30 mm), a transition layer (gravel with a thickness of 10 cm and a diameter of 4-15 mm), a filter layer (volcanic rock with a thickness of 25 cm and a diameter of 0.5-5 mm) and a cover layer (gravel with a thickness of 10 cm and a diameter of 8-20 mm), and geotextile was laid between the layers. A bottom slope was 0.2%, a perforated water collection pipe was disposed and was connected to a vent pipe, the pipes had an inner diameter of 8 cm, the vent pipe was 15 cm higher than a tank body, and the water collection pipe and the vent pipe were respectively wrapped with geotextile. An aeration pipe was disposed on the water collection pipe, an aeration interval was 15 days, an aeration rate was 80 mL/min, and an aeration time was 2 days. Tank bottoms and tank walls adopted PE anti-seepage membranes, plants such as *Phragmites australis, Typha orientalis* and *Acorus calamus* were grown mixedly, and a planting density was 15 plants/m².

Figure 3:
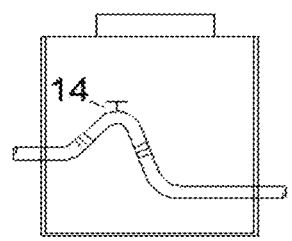
FIG. 3 is a schematic diagram of a siphon drainage subsystem.

The siphon drainage subsystem is shown in FIG. 3. A siphon was retractable and hump-shaped, a horizontal inclination angle of an ascending section of the hump was 45°, and a vacuum breaking valve was designed at a vertex of the hump. The vertex of the siphon was 15 cm higher than the water collection pipe of the silt ecological treatment subsystem, and a retractable height of the siphon was 20 cm. A water level of effluent of the siphon was 30 cm lower than a water level of the water collection pipe, and the siphon had an inner diameter of 8 cm.

Figure 4:
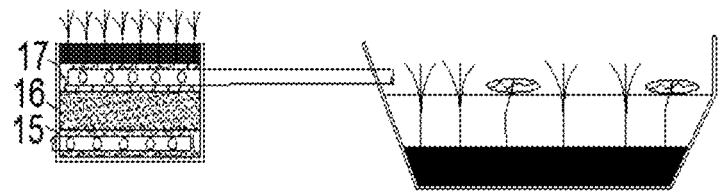
FIG. 4 is a schematic diagram of a river silt leachate advanced treatment subsystem.

The silt leachate advanced treatment subsystem is shown in FIG. 4. Tank bottoms and tank walls of two stages of ecological treatment units all adopted PE anti-seepage membranes. Fillers of an upflow wetland were disposed in layers from bottom to top, including a water inlet layer (gravel with a thickness of 15 cm and a diameter of 10-30 mm), a filter layer (volcanic rock with a thickness of 20 cm and a diameter of 0.5-5 mm) and a drainage layer (gravel with a thickness of 15 cm and a diameter of 10-30 mm). A perforated water inlet pipe and a drainage pipe of the upflow wetland were respectively disposed in the water inlet layer and the drainage layer, the pipes had an inner diameter of 8 cm, a water level difference between the two pipes was 28 cm, and the water level of the water inlet pipe was 60 cm lower than the vertex of the siphon. A surface flow wetland had the same water level as the river/lake, and was separated from the river/lake with wood piles. Multiple aquatic plants, such as *Phragmites australis, Acorus calamus, Canna indica* and rush pith, were grown mixedly on the upflow wetland and the surface flow wetland, and floating-leaved plants, such as *Nymphaea tetragona*, were used to embellish the surface flow wetland, thereby creating a landscape.

After 6 months of operation of the integrated riparian system, the water content of the silt was reduced from 90% to 45%. After silt leachate was subjected to advanced treatment, concentrations of pollutants such as COD, TN, TP, ammonia nitrogen, copper, mercury and arsenic in effluent were respectively 14.5 mg/L, 0.5 mg/L, 0.13 mg/L, 0.4 mg/L, 0.9 mg/L, 0.0008 mg/L and 0.045 mg/L, so the effluent reached Class III water quality standard and could be directly discharged into the river.

Comparative Example 1

A water content in untreated silt was 90%, and concentrations of pollutants such as COD, TN, TP, ammonia nitrogen, copper, mercury and arsenic in leachate are shown in Table 1, so the leachate belonged to inferior Class V water and could not be directly discharged into the river.

Comparative Example 2

Figure 5:
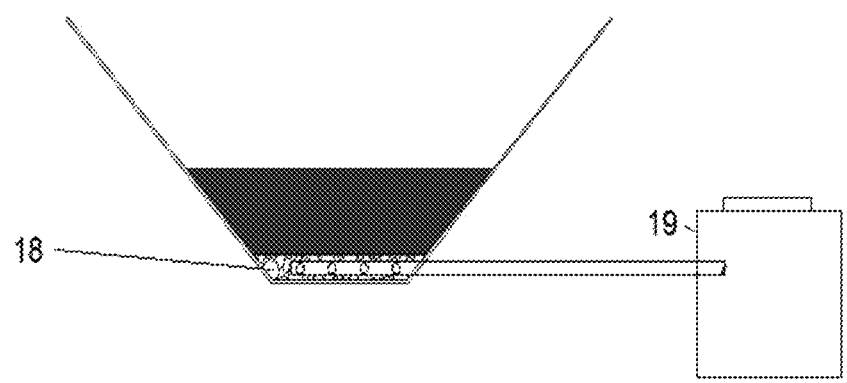
FIG. 5 is a schematic diagram of a river side silt landfill tank.

A conventional silt landfill tank with the same size and shape as the silt ecological treatment subsystem was dug at the same river side (in FIG. 5, without plants, fillers, aeration pipes and vent pipes), silt was spread in the silt landfill tank, and a height of filling was 15 cm each time. A bottom of the landfill tank was provided with a drainage layer (gravel with a thickness of 15 cm and a diameter of 20 mm), a water collection pipe having an inner diameter of 8 cm was laid in the drainage layer, and collected silt leachate (naturally treated silt leachate) was discharged into a water collection well. After 6 months of operation, the water content of the silt was reduced from 90% to 79%. Concentrations of pollutants such as COD, TN, TP, ammonia nitrogen, copper, mercury and arsenic in the silt leachate are shown in Table 1, so the silt leachate belonged to inferior Class V water and could not be directly discharged into the river.

Comparative Example 3

Only the silt ecological treatment subsystem in Example 1 was adopted (leachate advanced treatment was not performed). The water content in treated silt was 47%, and concentrations of pollutants such as COD, TN, TP, ammonia nitrogen, copper, mercury and arsenic in effluent are shown in Table 1, so the effluent belonged to Class V water and could not be directly discharged into the river.

Comparative Example 4

The silt landfill tank and the leachate advanced treatment subsystem in Comparative Example 2 were adopted, and the rest operation steps were the same as in Example 1. The water content in treated silt was 79%, and concentrations of pollutants such as COD, TN, TP, ammonia nitrogen, copper, mercury and arsenic in effluent are shown in Table 1, so the effluent belonged to inferior Class V water and could not be directly discharged into the river.

Comparative Example 5

Compared with Comparative Example 3, the aeration device of the silt ecological treatment subsystem was removed. The water content in treated silt was 52%, and concentrations of pollutants such as COD, TN, TP, ammonia nitrogen, copper, mercury and arsenic in effluent are shown in Table 1, so the effluent belonged to Class V water and could not be directly discharged into the river.

TABLE 1

Concentrations of pollutants in silt leachate after different treatments

| Leachate | Example 1 | Comparative Example 1 | Comparative Example 2 | Comparative Example 3 | Comparative Example 4 | Comparative Example 5 |
|---|---|---|---|---|---|---|
| COD content (mg/L) | 14.5 | 48.9 | 48.3 | 27 | 39.8 | 31 |
| TN content (mg/L) | 0.5 | 4.7 | 4.3 | 2.1 | 3.4 | 2.4 |
| TP content (mg/L) | 0.13 | 1.3 | 1.2 | 0.23 | 0.94 | 0.29 |
| Ammonia nitrogen content (mg/L) | 0.4 | 3.4 | 3.6 | 1.3 | 2.8 | 1.8 |
| Copper content (mg/L) | 0.9 | 1.5 | 1.2 | 0.9 | 1.1 | 1.0 |
| Mercury content (mg/L) | 0.0008 | 0.0017 | 0.0012 | 0.0009 | 0.001 | 0.001 |
| Arsenic content (mg/L) | 0.045 | 0.153 | 0.140 | 0.092 | 0.112 | 0.093 |
| Water quality standard | Class III water | Inferior Class V water | Inferior Class V water | Class V water | Inferior Class V water | Class V water |

Data of Example 1, Comparative Example 3 and Comparative Example 4 in Table 1 are converted relative to data of Comparative Example 2 (removal rate of pollutants in effluent relative to Comparative Example 2) to obtain treatment effects of different units alone on pollutants, which are shown in Table 2.

TABLE 2

Removal effects on pollutants in silt leachate after different treatments

| Leachate | Example 1 | Comparative Example 3 | Comparative Example 4 | Combined effects of Comparative Examples 3 and 4 |
|---|---|---|---|---|
| COD removal rate (%) | 69.98% | 44.10% | 17.60% | 61.70% |
| TN removal rate (%) | 88.37% | 51.16% | 20.93% | 72.09% |
| TP removal rate (%) | 89.17% | 80.83% | 21.67% | 102.50% |
| Ammonia nitrogen removal rate (%) | 88.89% | 63.89% | 22.22% | 86.11% |
| Copper removal rate (%) | 25.00% | 25.00% | 8.33% | 33.33% |
| Mercury removal rate (%) | 33.33% | 25.00% | 16.67% | 41.67% |
| Arsenic removal rate (%) | 67.86% | 34.29% | 20.00% | 54.29% |

As can be seen from Table 1 and Table 2, the contents of pollutants COD, TN, ammonia nitrogen and arsenic in the effluent treated by the silt ecological treatment subsystem alone in Comparative Example 3 are respectively 27 mg/L, 2.1 mg/L, 1.3 mg/L and 0.092 mg/L, and as compared with Comparative Example 2, the removal rates of COD, TN, ammonia nitrogen and arsenic are respectively 44.10%, 51.16%, 63.89% and 34.29%. The contents of pollutants COD, TN, ammonia nitrogen and arsenic in the effluent treated by the silt landfill tank and the leachate advanced treatment subsystem in Comparative Example 4 are respectively 39.8 mg/L, 3.4 mg/L, 2.8 mg/L and 0.112 mg/L, and as compared with Comparative Example 2, that is, after treatment by the leachate advanced treatment subsystem alone, the removal rates of pollutants COD, TN, ammonia nitrogen and arsenic are respectively 17.60%, 20.93%, 22.22% and 20%. In the disclosure, the contents of pollutants COD, TN, ammonia nitrogen and arsenic in the effluent after combined treatment by the silt ecological treatment subsystem and the leachate advanced treatment subsystem in Example 1 are respectively 14.5 mg/L, 0.5 mg/L, 0.4 mg/L and 0.045 mg/L, and as compared with Comparative Example 2, the removal rates of pollutants COD, TN, ammonia nitrogen and arsenic respectively reach 69.98%, 88.37%, 88.89% and 67.86%, which are higher than the combined effects (respectively 61.70%, 72.09%, 86.11% and 54.29%) of the silt ecological treatment subsystem alone and the leachate advanced treatment subsystem alone, indicating that the silt ecological treatment subsystem and the leachate advanced treatment subsystem added support each other in the removal of pollutants COD, TN, ammonia nitrogen and arsenic.

Thus, it can be seen that when the integrated riparian system of the disclosure is used to treat the river silt, dewatering and harmlessness of the silt, advanced treatment of the silt leachate and purification of part of the river/lake water can be effectively realized through synergetic effects of transpiration and absorption of the plants, filtration and adsorption of the fillers and degradation of microorganisms as well as the auxiliary effects of aeration and oxygenation.

Comparative Example 6

With reference to "Application of Siphon-type Effluent Cut-off Form in Large Sewage Pumping Station" (document), a filling flow (Q) of the siphon is $Q=g^{1/2} \times D^{2.5} \times (0.53-0.17\alpha/90°)$, where D is the pipe diameter 8 cm, and a is a horizontal angle of an ascending section of the siphon. In Example 1, considering the land occupation, the horizontal angle was set to 45°. In Example 1, the filling rate of the siphon was 0.0025 m³/s. In Comparative Example 6, the hump-shaped siphon in the siphon drainage subsystem was replaced with a U-shaped siphon, and the filling flow of the siphon was 0.0020 m³/s. The filling flow of the siphon in Example 1 was greater than that in Comparative Example 6, indicating that the hump-shaped siphon has better siphon effects.

Although the disclosure has been disclosed as above in the preferred examples, it is not intended to limit the disclosure. Any person skilled in the art can make various changes and modifications without departing from the spirit and scope of the disclosure. Therefore, the protection scope of the disclosure should be as defined in the claims.

What is claimed is:

1. An integrated riparian system for river or lake silt on-site treatment, comprising three subsystems, namely, a silt ecological treatment subsystem, a siphon drainage subsystem and a silt leachate advanced treatment subsystem, wherein the silt ecological treatment subsystem is provided with plants, fillers, an aeration pipe and a water collection pipe from top to bottom and equipped with a vent pipe, and the vent pipe is connected to the water collection pipe; a siphon used by the siphon drainage subsystem is retractable and hump-shaped; the silt leachate advanced treatment subsystem comprises two stages of ecological treatment units, namely, an upflow wetland and a surface flow wetland, wherein the upflow wetland is provided with the fillers in layers; the fillers of the silt ecological treatment subsystem comprise a drainage layer, a transition layer, a filter layer and a cover layer from bottom to top; the fillers of the upflow wetland comprise a water inlet layer, a filter layer and a drainage layer from bottom to top; and emergent plants are grown in the silt ecological treatment subsystem, emergent plants and hygrophytes are grown on the upflow wetland of the silt leachate advanced treatment subsystem, and emergent plants, floating-leaved plants and submerged plants are grown in the surface flow wetland.

2. The integrated riparian system according to claim 1, wherein the drainage layer in the silt ecological treatment subsystem is gravel with a thickness of 10-30 cm and a diameter of 10-30 mm; the transition layer is gravel with a thickness of 10 cm and a diameter of 4-15 mm; the filter layer is volcanic rock with a thickness of 25 cm and a diameter of 0.5-5 mm; and the cover layer is gravel with a thickness of 10 cm and a diameter of 8-20 mm.

3. The integrated riparian system according to claim 1, wherein a bottom slope of the silt ecological treatment subsystem is 0.1%-0.3%; the water collection pipe is a perforated pipe connected to the vent pipe, the pipes each have an inner diameter of 8-15 cm, the vent pipe is 15-30 cm higher than a tank body, and the water collection pipe and the vent pipe are each wrapped with geotextile; and the aeration pipe is closely attached to the water collection pipe and disposed thereon.

4. The integrated riparian system according to claim 1, wherein a horizontal inclination angle of an ascending section of the retractable hump-shaped siphon of the siphon drainage subsystem is 30-45°, a height of the siphon is flexibly adjustable in a range of 15-50 cm, a vertex of the hump is 15-35 cm higher than the water collection pipe of the silt ecological treatment subsystem, a water level of effluent of the siphon is 20-40 cm lower than a water level of the water collection pipe, and the siphon has an inner diameter of 8-15 cm.

5. The integrated riparian system according to claim 1, wherein the water inlet layer of the upflow wetland in the silt leachate advanced treatment subsystem is gravel with a thickness of 10-30 cm and a diameter of 10-30 mm; the filter layer is volcanic rock with a thickness of 15-30 cm and a diameter of 0.5-5 mm; and the drainage layer is gravel with a thickness of 10-30 cm and a diameter of 10-30 mm.

6. The integrated riparian system according to claim 1, wherein a perforated water inlet pipe and a drainage pipe are respectively disposed in the water inlet layer and the drainage layer of the upflow wetland in the silt leachate advanced treatment subsystem, the pipes have an inner diameter of 8-15 cm, a water level difference between the two pipes is 20-40 cm, and the water level of the water inlet pipe is 40-60 cm lower than a vertex of the hump of the siphon.

7. The integrated riparian system according to claim 1, wherein the surface flow wetland in the silt leachate advanced treatment subsystem has a same water level as a river or lake.

8. The integrated riparian system according to claim 1, wherein PE anti-seepage membranes are laid on tank bottoms and tank walls of the silt ecological treatment subsystem and the silt leachate advanced treatment subsystem, and geotextile is laid between the layers of fillers.

9. The integrated riparian system according to claim 1, wherein the fillers of the silt ecological treatment subsystem are disposed in layers from bottom to top, comprising the drainage layer, the transition layer, the filter layer and the cover layer; the drainage layer is gravel with a thickness of 15 cm and a diameter of 10-30 mm; the transition layer is gravel with a thickness of 10 cm and a diameter of 4-15 mm; the filter layer is volcanic rock with a thickness of 25 cm and a diameter of 0.5-5 mm; the cover layer is gravel with a thickness of 10 cm and a diameter of 8-20 mm; the fillers of the first-stage ecological treatment unit upflow wetland of the silt leachate advanced treatment subsystem are disposed in layers from bottom to top, comprising the water inlet layer, the filter layer and the drainage layer; the water inlet layer is gravel with a thickness of 15 cm and a diameter of 10-30 mm; the filter layer is volcanic rock with a thickness of 20 cm and a diameter of 0.5-5 mm; the drainage layer is gravel with a thickness of 15 cm and a diameter of 10-30 mm; and the emergent plants are grown in the silt ecological treatment subsystem, the emergent plants and the hygrophytes are grown on the upflow wetland of the silt leachate advanced treatment subsystem, and the emergent plants, the floating-leaved plants and the submerged plants are grown in the surface flow wetland.

10. A method of using the integrated riparian system according to claim 1 to treat silt, comprising:
(1) performing a silt ecological treatment, wherein river or lake silt with a water content of higher than 70% is added at a load of 50-80 kg dry matter/($m^2 \cdot a$) and spread in layers on the cover layer of the silt ecological treatment subsystem every 30-60 days with a thickness of not more than 15 cm each time until a tank body is fully filled, a final height of filling being 0.5-1.2 m, and the silt is removed when the water content is reduced to 50% or below, wherein the silt ecological treatment subsystem is equipped with a vent pipe and an aeration pipe inside, an aeration interval is 15-30 days, an aeration rate is 50-100 mL/min, and an aeration time is 1-2 days, thereby realizing dewatering and harmlessness of the silt;
(2) automatically discharging leachate collected by the water collection pipe at the bottom of the silt ecological treatment subsystem to the silt leachate advanced treatment subsystem through the siphon drainage subsystem; and
(3) in the silt leachate advanced treatment subsystem, the leachate being sequentially subjected to two stages of ecological treatment, namely the upflow wetland and the surface flow wetland, discharging effluent into the river or lake after reaching a standard, and river or lake water entering the surface flow wetland when there is insufficient water, thereby realizing purification of part of the river or lake water.

\* \* \* \* \*